United States Patent
Wong

(10) Patent No.: US 10,118,277 B2
(45) Date of Patent: Nov. 6, 2018

(54) MULTI-ANGLE MAGNETIC HOLDER

(71) Applicant: Harry Wong, South Pasadena, CA (US)

(72) Inventor: Harry Wong, South Pasadena, CA (US)

( * ) Notice: Subject to any disclaimer, the term of this patent is extended or adjusted under 35 U.S.C. 154(b) by 0 days.

(21) Appl. No.: 15/924,202

(22) Filed: Mar. 17, 2018

(65) Prior Publication Data
US 2018/0215013 A1 Aug. 2, 2018

Related U.S. Application Data

(63) Continuation-in-part of application No. 15/297,977, filed on Oct. 19, 2016.

(51) Int. Cl.
*B25B 11/00* (2006.01)
*F16M 13/02* (2006.01)

(52) U.S. Cl.
CPC ......... *B25B 11/002* (2013.01); *F16M 13/022* (2013.01)

(58) Field of Classification Search
CPC ..... F16M 13/022; F16M 11/2007; F16B 1/00; F16B 2001/0035; B25B 11/002
USPC ......... 248/407, 206.5, 683, 537, 467, 309.4; 403/113
See application file for complete search history.

(56) References Cited

U.S. PATENT DOCUMENTS

| | | | | |
|---|---|---|---|---|
| 63,792 A * | 4/1867 | Morse et al. | ............. | A61F 2/64 403/113 |
| 109,782 A * | 11/1870 | Van Patten | ............... | A61F 2/64 403/113 |
| 210,510 A * | 12/1878 | English | ................. | F16C 11/045 403/156 |
| 2,121,572 A * | 6/1938 | Polden | ..................... | G02C 5/22 16/228 |
| 2,442,136 A * | 5/1948 | Luther | ................... | B23Q 3/154 33/569 |
| 2,884,698 A * | 5/1959 | Wursch | .............. | B23K 37/0435 24/303 |
| 3,034,754 A * | 5/1962 | Trindl | .................... | F16M 11/22 248/158 |
| 3,499,225 A * | 3/1970 | Darrah | ..................... | G01C 9/28 33/347 |
| 4,208,797 A * | 6/1980 | Stewart, Jr. | ............ | G01B 3/002 33/613 |
| 4,270,723 A * | 6/1981 | Takahashi | ............ | B23Q 1/5468 248/281.11 |
| 4,463,475 A * | 8/1984 | Rivers | ....................... | E05D 5/02 16/241 |

(Continued)

*Primary Examiner* — Muhammad Ijaz
(74) *Attorney, Agent, or Firm* — Jen-Feng Lee, Esq.

(57) ABSTRACT

A multi-angle magnetic holder includes a first arm piece having a first center magnetic block; a first set of two opposite outside covers tightly wrapping the first center magnetic block between the covers; a second arm piece having a second center magnetic block; a second set of two opposite covers tightly wrapping the second center magnetic block between the covers; and a locking hinge serving as rotatable connection between the first and second arm pieces. A tightening mechanism is provided to receive a hex key into a matching key hole for purpose of setting and adjusting desired angles formed between the first and second arm pieces. The multi-angle magnetic holder has a first acute angle and a second acute angle.

4 Claims, 7 Drawing Sheets

(56) References Cited

U.S. PATENT DOCUMENTS

| | | | | |
|---|---|---|---|---|
| 4,543,584 | A | * | 9/1985 | Leer .................... H01Q 1/08 |
| | | | | 248/537 |
| 5,459,935 | A | * | 10/1995 | Paulson ................ G01B 3/566 |
| | | | | 33/451 |
| 5,760,668 | A | * | 6/1998 | Testa ................... B23Q 3/1546 |
| | | | | 206/350 |
| 5,971,379 | A | * | 10/1999 | Leon, Jr. ............... B25B 11/002 |
| | | | | 228/212 |
| D535,577 | S | * | 1/2007 | Wong ..................... D10/74 |
| 7,638,698 | B1 | * | 12/2009 | Bellissimo ............ G10G 5/00 |
| | | | | 84/327 |
| 2003/0005590 | A1 | * | 1/2003 | Snyder ................... G01C 9/28 |
| | | | | 33/370 |
| 2007/0193104 | A1 | * | 8/2007 | Molyneux .............. A01K 91/04 |
| | | | | 43/4 |
| 2007/0277387 | A1 | * | 12/2007 | Morrell .................. B25H 7/00 |
| | | | | 33/429 |
| 2009/0189324 | A1 | * | 7/2009 | Wong ................... B23Q 3/1546 |
| | | | | 269/8 |
| 2013/0105642 | A1 | * | 5/2013 | Marq ..................... G09F 7/04 |
| | | | | 248/121 |
| 2015/0159425 | A1 | * | 6/2015 | Algar ..................... E06B 7/28 |
| | | | | 52/202 |
| 2016/0041454 | A1 | * | 2/2016 | McElderry ........... G03B 17/566 |
| | | | | 396/428 |
| 2018/0106423 | A1 | * | 4/2018 | Wong ................... F16M 13/022 |
| 2018/0215013 | A1 | * | 8/2018 | Wong ................... B25B 11/002 |

* cited by examiner

MULTI-ANGLE MAGNETIC HOLDER

PRIORITY CLAIM

The present invention is a continuation in part, under 37 CFR 1.53(b), of a co-pending United States non-provisional parent application by the same inventor (Harry WONG), also entitled Multi-Angle Magnetic Holder having U.S. application Ser. No. 15/297,977, filed Oct. 19, 2016 the disclosure of which is incorporated herein by reference. Present CIP application claims priority of the filing date of Oct. 19, 2016, per the requirements of 35 U.S.C. § 120 and 37 C.F.R. 1.78.

FIELD AND BACKGROUND OF THE INVENTION

Present invention disclosed and claimed a magnetic holding device for holding metal and magnetizable work pieces. More specifically, the magnetic holding device disclosed in present application provides an easy angle settling feature, including some common preset angles, that are easy and convenient for day to day usage, making this a versatile tool that greatly enhances productivity.

SUMMARY OF THE INVENTION

The invention relates to magnetic holding tools that can be used on iron, metal and other magnetizable objects. The holding tools have two arm pieces that, depending on users' setting, easily form an angle as desired, by using a hex key (aka Allen key) to quickly set the angle.

Fixed angle version is provided for 90-degree inside; and 30-degree, 60-degree and 90-degree outside clamping applications are made easy as well.

Variable angle version allows for any angle clamping, from 30-degree to 180-degree. Some quick angle setting features are available for 30-degree (no pin), 45-degree (pin inserted in a 45D hole) and 90-degree (pin in a notch).

A hex hole is made on an arm piece, allowing the use of an Allen key, or other similar hard object, to pry the magnetic holding tool away from the work piece.

A locking hinge, with a six-sided Allen key hole, provides for a simple tightening mechanism to use an Allen key (hex key) to set/adjust the desired angle formed by pivoting the two arm pieces.

A multi-angle magnetic holder includes a first arm piece having a first center magnetic block; a first set of two opposite outside covers tightly wrapping the first center magnetic block between the covers; a second arm piece having a second center magnetic block; a second set of two opposite covers tightly wrapping the second center magnetic block between the covers; and a locking hinge serving as rotatable connection between the first and second arm pieces. A tightening mechanism is provided to receive a hex key into a matching key hole for purpose of setting and adjusting desired angles formed between the first and second arm pieces. The multi-angle magnetic holder has a first acute angle setting and a second acute angle setting.

The multi-angle magnetic holder also optionally includes a hex hole formed on one of the two arm pieces to receive a match hex key for prying action. A circular shaped through hole can be formed for receiving a round pin shaped as a rod. The two end tips of the round pin can be wedged or otherwise engaged into a concave notch for limiting a set angle of the multi-angle magnetic holder to a first acute angle. A second arm stopping edge can be formed on the second arm so that it limits motion of the first arm piece and the second arm piece to an angle held constant at a second acute angle. The second acute angle is smaller than the first acute angle.

The second arm stopping edge abuts an upper edge of the first arm left outside cover outside layer and the upper edge of the first arm right outside cover outside layer in a second acute angle mode. The multi-angle magnetic holder has a third angle which is a right angle formed when the round pin engages an inside edge of the second arm. The multi-angle magnetic holder has a third angle which is a right angle formed when the round pin engages an inside edge of the second arm.

DESCRIPTION OF THE DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows.

Figure 1:
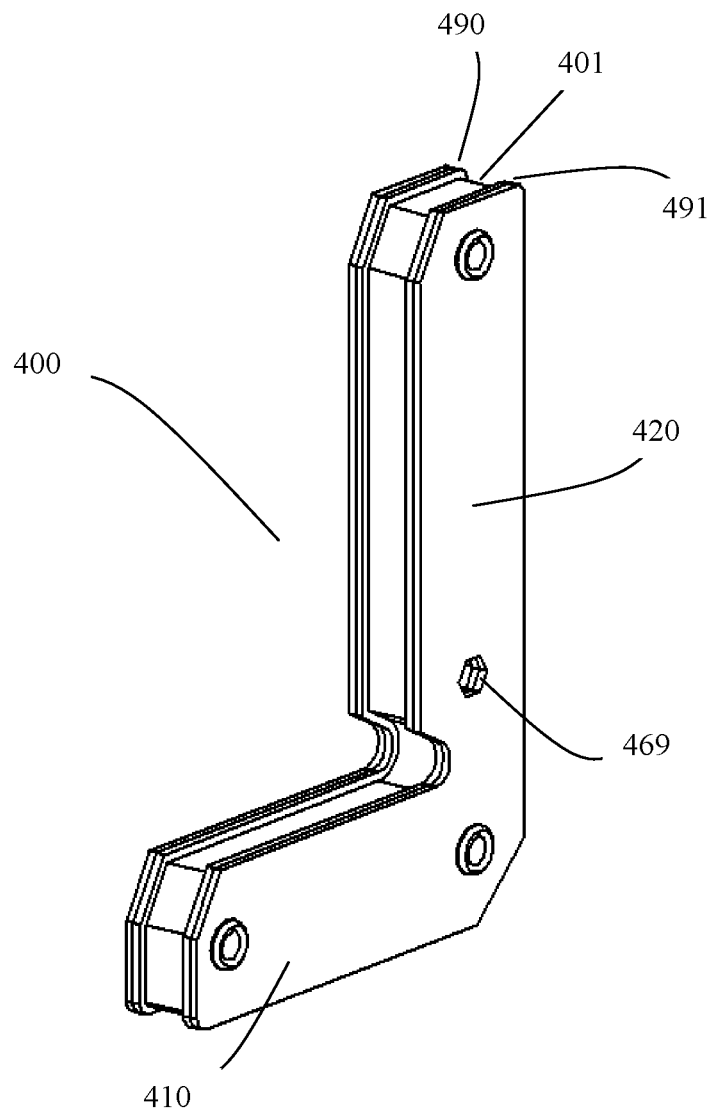
FIG. 1 shows a fixed angle version of a magnetic holder, with some outside bevel angles preset to 30, 45, or 60 degrees as selected and made by manufacturers.

The following call out list of elements can be a useful guide in referencing the elements of the drawings.

10 magnetic holder
21 first arm magnetic block first retaining connector
22 first arm magnetic block second retaining connector
23 second arm magnetic block first retaining connector
24 second arm magnetic block second retaining connector
31 first arm left outside cover inside layer
32 first arm left outside cover outside layer
33 first arm right outside cover inside layer
34 first arm right outside cover outside layer
35 second arm left outside cover inside layer
36 second arm left outside cover outside layer
37 second arm right outside cover inside layer 38 second arm right outside cover outside layer
39 second arm stopping edge
100 first arm piece
101 first center magnetic block
102 gap
103 first arm piece upper edge
129 concave notch
169 hex hole
190 first arm left outside cover
191 first arm right outside cover
198 locking hinge engagement opening
199 locking hinge
200 second arm piece
201 second center magnetic block
245 hole
249 round pin
260 protruding nut
290 second arm left outside cover
291 second arm right outside cover
350 tightening mechanism
400 multi-angle magnetic clamping tool
401 second arm magnetic portion
410 first arm piece
420 second arm piece
490 outside cover
491 outside cover

DETAILED DESCRIPTION OF THE PREFERRED EMBODIMENT

Figure 2:
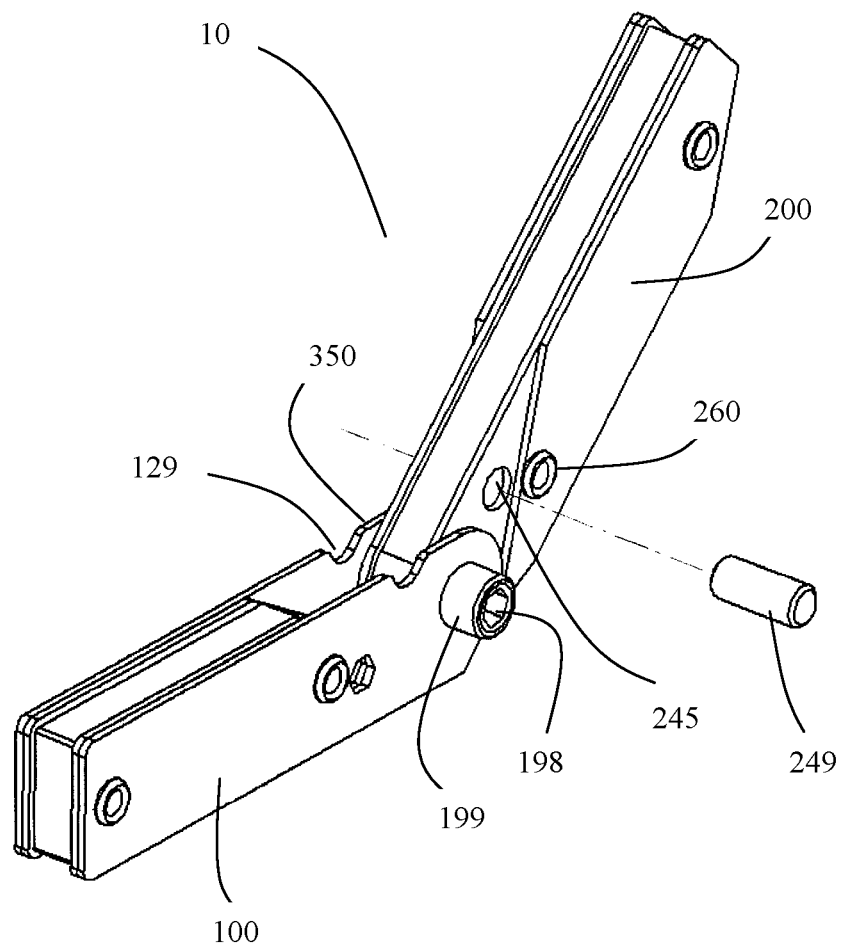
FIG. 2 shows a variable angle magnetic holder, with a round pin adjacent to the holder indicated by a dotted line noting the place of insertion into a 45 D hole (hole for 45-degree setting) in the second arm piece.

A multi-angle magnetic holder 10 includes a first arm piece 100, and second arm piece 200. As shown in FIG. 2, the first arm piece 100 has a first center magnetic block 101, which is tightly wrapped in between two opposite outside covers 190 and 191, namely a first arm left outside cover 190 and a first arm right outside cover 191.

Second arm piece 200 has a second center magnetic block 201, which is tightly wrapped in between two opposite outside covers 290 and 291, namely a second arm left outside cover 290 and a second arm right outside cover 291.

By the term "wrapped", a person reasonably skilled in the art can understand, also from other disclosures made herein, that the two outside pieces are arranged to cover the sides, in addition to form connection with the magnetic block(s) from the two sides as shown. Wrapped can also include a laminate style construction where magnetic members are laminated to ferrous members. First arm piece 100 and second arm piece 200, along with the outside covers, are hingeably connected at an end with a locking hinge 199, so that a desired angle can be made by pivoting at the hinge connection point, as measured from the edges of first arm piece 100 and second arm piece 200. The locking hinge 199 is actuated by a hexagonal shape locking hinge engagement opening 198.

The first arm has a first center magnetic block 101 secured to the first arm left outside cover 190 and first arm right outside cover 191 by a first connector and a second connector, namely a first arm magnetic block first retaining connector 21 and a first arm magnetic block second retaining connector 22. The first connector and the second connector can be formed as rivets or bolts. The bolts can have a smooth portion in the shape of a rod for engaging the first center magnetic block 101. A gap 102 is formed next to the first center magnetic block 101. The gap 102 receives a lower portion of the second arm magnetic portion 401. The second arm magnetic portion 401 can be made as a block so that it is a second magnetic block. The second magnetic block has preferably a pair of connectors for retaining the second magnetic block to the second arm left outside cover 290 and the second arm right outside cover 291. The second magnetic block can be retained by a second arm magnetic block first retaining connector 23 and a second arm magnetic block second retaining connector 24.

Figure 3:
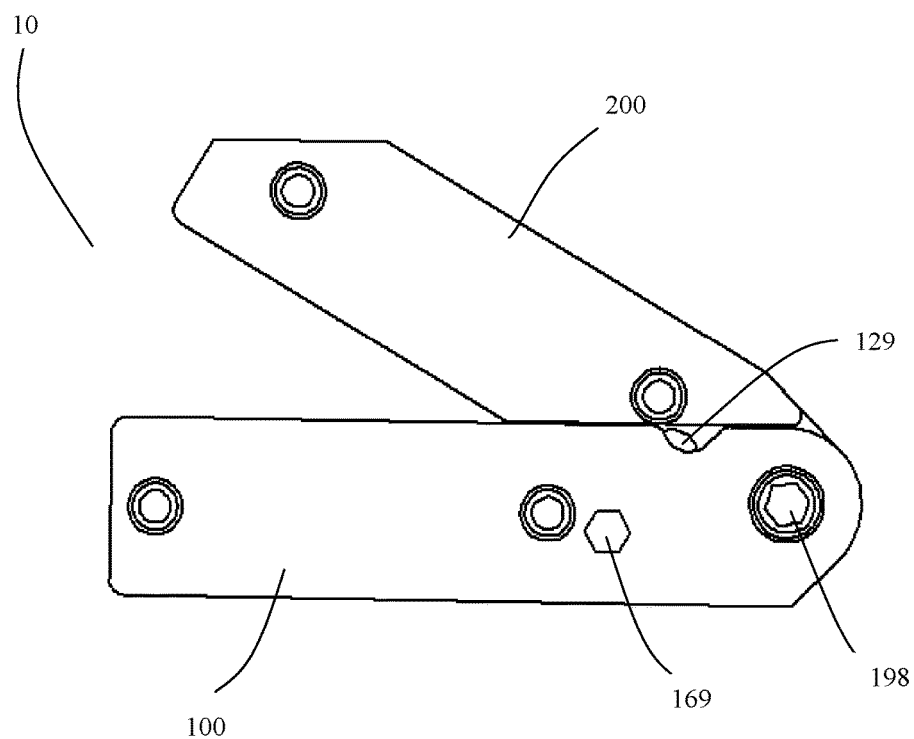
FIG. 3 shows the variable angle magnetic holder, with the two arm pieces maintaining a 30-degree angle where the protruding nut rests on an edge of the first arm piece.
Figure 4:
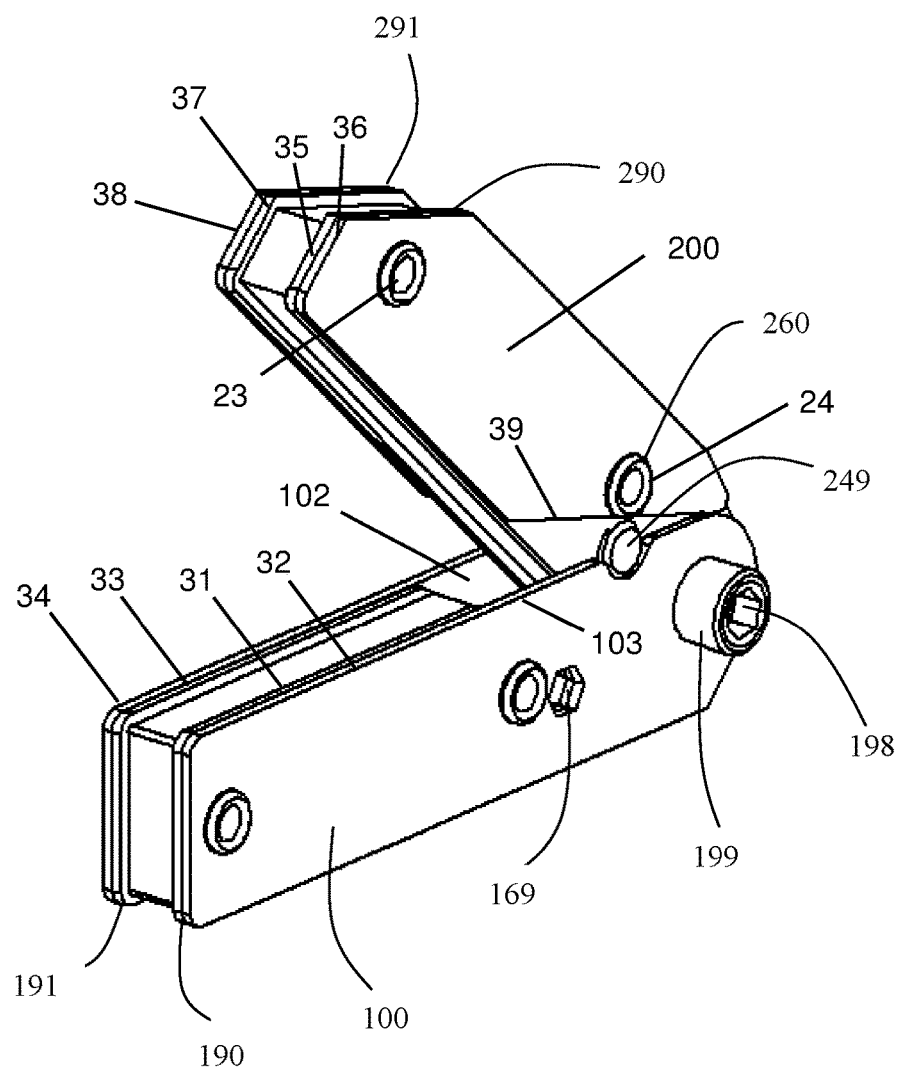
FIG. 4 shows the variable angle magnetic holder, with the two arm pieces maintaining a 45-degree angle where the round pin is inserted into the 45D hole and the tips of the round pin are wedged into the concave notch of the first arm piece.
Figure 5:
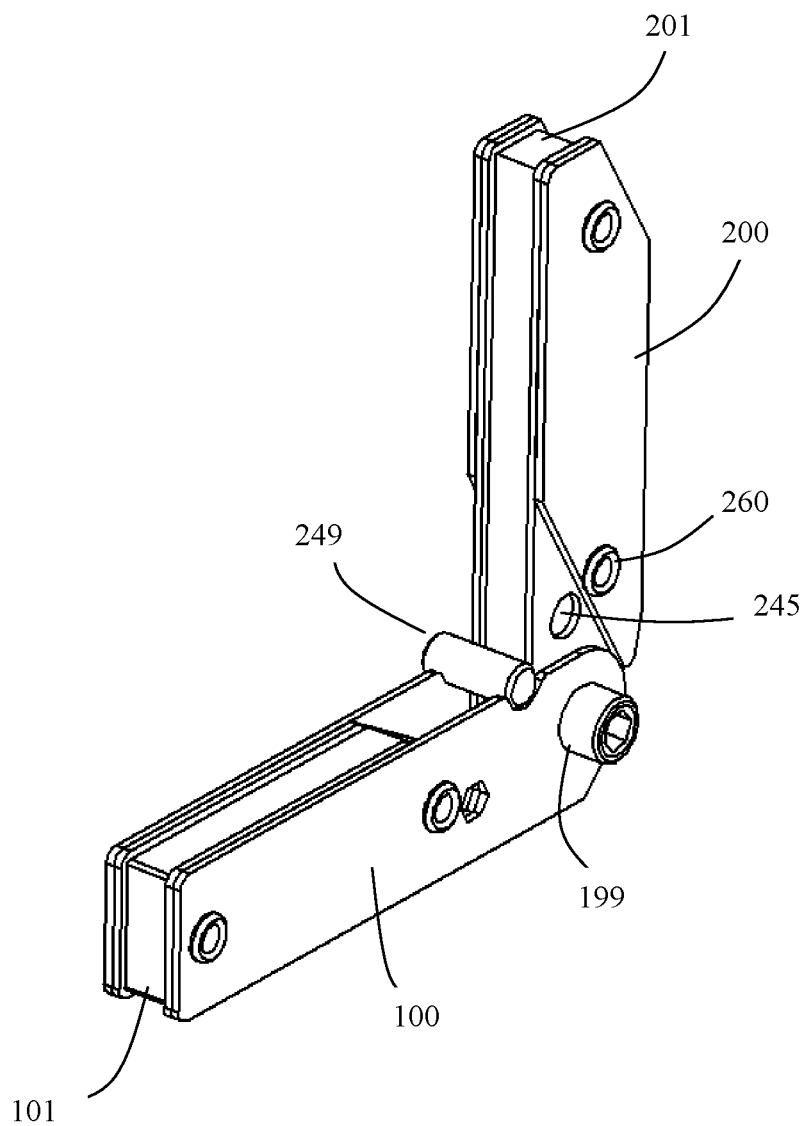
FIG. 5 shows the variable angle magnetic holder, with the two arm pieces maintaining a 90-degree angle where the round pin are placed into the concave notch, creating a contact point on the second arm piece and opening a 90-degree angle between the two arm pieces.
Figure 6:
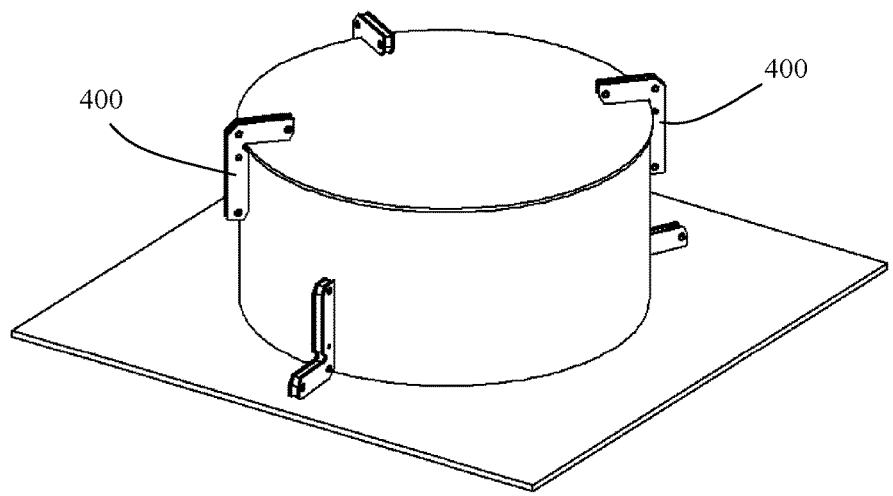
FIG. 6 shows a sample usage by the magnetic holders disclosed in this application. A round cover plate is clamped to a cylindrical tank using three fixed angle version magnetic holders, and the tank is clamped to the base plate using three fixed angle holders (one is behind the tank and not shown).
Figure 7:
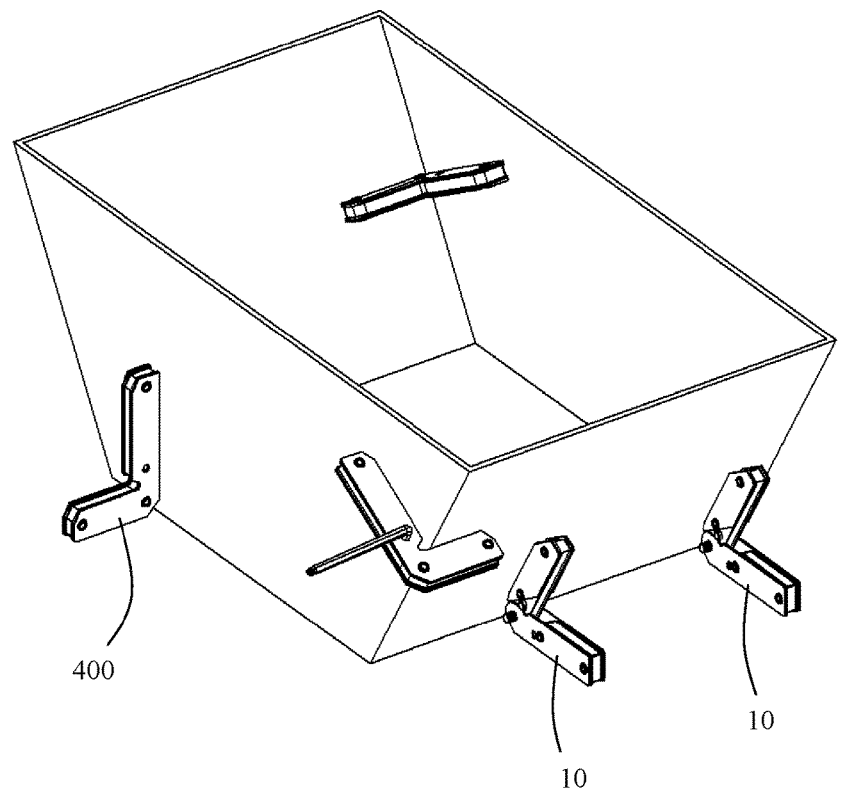
FIG. 7 shows another sample usage by the magnetic holders disclosed in this application. A trapezoidal tank is formed by clamping four metal plates together. An Allen key is shown inserted to the hex hole of one fixed angle magnetic holder, allowing for prying action to remove the magnetic holders.

FIGS. 3-5 show formed angles of 30-degree, 45-degree and 90-degree, respectively.

The locking hinge 199 provides a six-sided Allen key hole with an internal (not shown) tightening mechanism 350 adjustable by an Allen key. The tightening mechanism 350 can be any commercially available screwing mechanism to tighten and set an angle between the first arm piece 100 and second arm piece 200 and is a known art that requires no further disclosure herein.

As shown in FIGS. 2 and 4, the two opposite covers 190/191 of the first arm piece 100 have a concave notch 129 in a location near the locking hinge 199. The second arm piece has a hole 245 in a location near the locking hinge 199, so that a round pin 249 can be placed into the hole 245 when the two arm pieces 100/200 are pivoting to close the angle between them, the two end tips of the round pin 249 will get wedged into the concave notch 129, forming a 45-degree angle between the first arm piece 100 and the second arm piece 200. The concave notch 129 can be formed with a semicircular profile.

As shown in FIGS. 2 and 3, the second arm piece 200 has a protruding nut 260 so that when the two arm pieces 100/200 are pivoting to close the angle, the protruding nut 260 will rest on an edge of one of the opposite covers 190/191 of the first arm piece 100, forming a 30-degree angle. As shown in FIGS. 2 and 5, the round pin 249 can be placed on top of the concave notch 129, so that when the two arm pieces 100/200 are pivoting to close the angle between them, the second arm piece 200 will stop at the contact point of the round pin 249, resulting in a 90-degree angle between the two arm pieces 100/200.

A hex hole 169 is made on either the first arm piece 100 or the second arm piece 200, also through the two outside covers 190/191, or 290/291. The hex hole 169 permits an Allen key to be inserted through, or any small hard pin or similarly shaped object to be inserted through, providing a prodding force to pry the magnetic holder away from a work object being held or clamped onto.

The round pin 249 and the outside covers 190/191 and 290/291 are all made from magnetizable materials, such as iron or similar metals.

A variant version of the multi-angle magnetic clamping tool 400 is provided, as shown in FIG. 1, where there is a fixed angle between the first arm piece 410 and second arm piece 420. A set of opposite outside covers 490 and 491 tightly wrapped the two arm pieces 410/420 in place, forming a fix 90-degree angle.

A hex hole 469 is provided on one of the arm pieces, allowing for easy prying action to separate the magnetic holder 400 from a work object.

At outside corners of the two arm pieces 410/420, including the outside covers 490/491, some angles are made to specifically correspond to 30-degree, 45-degree and 60-degree bevel angles, as shown in FIG. 1, so that the magnetic holder 400 can be used to hold material in place using these outside preset angles without needing to take any measurement. The second arm magnetic block second retaining connector 24 is adjacent to the hole.

The outside covers are of suitable metal materials that can properly become magnetized to transfer the magnetic attribute exerted by the two magnetic blocks, allowing easy attachment to work pieces with similar magnetizable attributes. Outside covers are each made preferably in a pair of layers. The first arm left outside cover has a first arm left outside cover inside layer 31, and a first arm left outside cover outside layer 32. The first arm right outside cover has a first arm right outside cover inside layer 33, and a first arm right outside cover outside layer 34. The second arm left outside cover has a second arm left outside cover inside layer 35, and a second arm left outside cover outside layer 36. The second arm right outside cover has a second arm right outside cover inside layer 37 and a second arm right outside cover outside layer 38. The second arm stopping edge 39 is formed when the second arm left outside cover outside layer 36 and the second arm right outside cover outside layer 38 terminate at an angle. The second arm stopping edge 39 limits the motion of the outside covers so that the angle is held constant at a second acute angle. The second arm stopping edge 39 abuts the upper edge of the first arm left outside cover outside layer 32 and the upper edge of the first arm right outside cover outside layer 34.

A first acute angle is the angle formed when the round pin 249 is inserted into the round hole 245 and then the end of the round pin 249 are resting on the concave notch 129. A second acute angle is a smaller angle formed when the round pin 249 is removed and the second arm stopping edge 39 abuts the upper edge of the first arm piece 100. The first arm piece upper edge 103 is formed as a pair of edges with a gap therebetween. A third angle is a right angle formed as shown on FIG. 5 when the round pin engages the inside edge of the second arm.

The invention claimed is:

1. A multi-angle magnetic holder, comprising:
   a first arm piece having a first center magnetic block;
   a first set of two opposite outside covers tightly wrapping the first center magnetic block between the covers;
   a second arm piece having a second center magnetic block;
   a second set of two opposite covers tightly wrapping the second center magnetic block between the covers; and
   a locking hinge serving as rotatable connection between the first and second arm pieces wherein a tightening mechanism is provided to receive a hex key into a matching key hole for purpose of setting and adjusting desired angles formed between the first and second arm pieces, wherein the multi-angle magnetic holder has a first acute angle setting and a second acute angle setting, wherein a hole is formed for receiving a round pin,
   wherein two end tips of the round pin are configured to be wedged into a concave notch, wherein when the two end tips of the round pin are wedged into the concave notch, the two end tips of the round pin for limiting a set angle of the multi-angle magnetic holder to the first acute angle, wherein the second arm stopping edge abuts an upper edge of the first arm left outside cover outside layer and the upper edge of the first arm right outside cover outside layer in a second acute angle mode.

2. The multi-angle magnetic holder of claim 1, wherein the multi-angle magnetic holder has a third angle which is a right angle formed when the round pin engages an inside edge of the second arm.

3. The multi-angle magnetic holder of claim 1, wherein a hex hole is formed on one of the two arm pieces to receive a match hex key for prying action.

4. The multi-angle magnetic holder of claim 3, wherein the multi-angle magnetic holder has a third angle which is a right angle formed when the round pin engages an inside edge of the second arm.

\* \* \* \* \*